United States Patent
Portnoy et al.

(10) Patent No.: US 11,216,221 B2
(45) Date of Patent: Jan. 4, 2022

(54) PRINT TERMINATION

(71) Applicant: HP INDIGO B.V., Amstelveen (NL)

(72) Inventors: Vitaly Portnoy, Ness Ziona (IL);
Michel Assenheimer, Ness Ziona (IL);
Yoav Nachmias, Ness Ziona (IL);
Miriel Cohen, Ness Ziona (IL)

(73) Assignee: HP Indigo B.V., Amstelveen (NL)

( * ) Notice: Subject to any disclaimer, the term of this patent is extended or adjusted under 35 U.S.C. 154(b) by 4 days.

(21) Appl. No.: 16/605,590

(22) PCT Filed: Apr. 27, 2017

(86) PCT No.: PCT/EP2017/060116
§ 371 (c)(1),
(2) Date: Oct. 16, 2019

(87) PCT Pub. No.: WO2018/196985
PCT Pub. Date: Nov. 1, 2018

(65) Prior Publication Data
US 2020/0133588 A1 Apr. 30, 2020

(51) Int. Cl.
*G06F 3/12* (2006.01)

(52) U.S. Cl.
CPC ............ *G06F 3/121* (2013.01); *G06F 3/1234* (2013.01)

(58) Field of Classification Search
CPC ...... G06F 3/121; G06F 3/1234; G06K 15/408
See application file for complete search history.

(56) References Cited

U.S. PATENT DOCUMENTS

| | | | |
|---|---|---|---|
| 4,547,211 A | 10/1985 | Ananias | |
| 5,305,058 A | 4/1994 | Sulenski et al. | |
| 5,316,289 A | 5/1994 | Matsuo | |
| 5,678,482 A | 10/1997 | Daniel et al. | |
| 7,395,004 B2 | 7/2008 | Nishikawa et al. | |
| 2008/0112734 A1* | 5/2008 | Furuya | G03G 15/0136 399/288 |
| 2011/0305468 A1* | 12/2011 | Fujiwara | G03G 15/5045 399/27 |
| 2014/0327924 A1 | 11/2014 | Oakley et al. | |
| 2015/0205652 A1* | 7/2015 | Noguchi | G06F 3/06 714/819 |
| 2018/0150267 A1* | 5/2018 | Oka | G03G 15/231 |
| 2018/0285028 A1* | 10/2018 | Yamada | G06F 3/1204 |

FOREIGN PATENT DOCUMENTS

| | | |
|---|---|---|
| JP | 6297800 | 5/1987 |
| WO | WO-2016000749 | 1/2016 |
| WO | WO-2016041598 | 3/2016 |

OTHER PUBLICATIONS

Events Definitions, (Mar. 3, 2017) Available at: ftp://ftp.hp.com/pub/gsb/Indigo/Industrial/Software/V2.0_(10021.0.0.28)_for_HP_Indigo_20000/EventsDefinitions.xml._ (67 pages).

\* cited by examiner

*Primary Examiner* — Benjamin O Dulaney
(74) *Attorney, Agent, or Firm* — Mannava & Kang

(57) ABSTRACT

In an example, a method for controlling termination of a print procedure subsequent to a node reset within print apparatus including a plurality of nodes includes identifying the node at which the reset occurred, and controlling operation within the print apparatus by way of a selected node. The selected node is different from the identified node and selected responsive to the identification of the identified node for operation of a component of the print apparatus as part of a termination procedure.

15 Claims, 5 Drawing Sheets

PRINT TERMINATION

BACKGROUND

A printing process within a printing apparatus or press can terminate for a wide variety of reasons. Unexpected print terminations can lead to damage of component parts such as subsystems and consumables/supplies within the printing engine of the printing apparatus. This can shorten the operational life of such components, requiring replacement and also impacting on the operational efficiency of such components and thus the printing apparatus.

BRIEF DESCRIPTION OF THE DRAWINGS

For a more complete understanding of the present disclosure, reference is now made to the following description taken in conjunction with the accompanying drawings in which.

Figure 1:
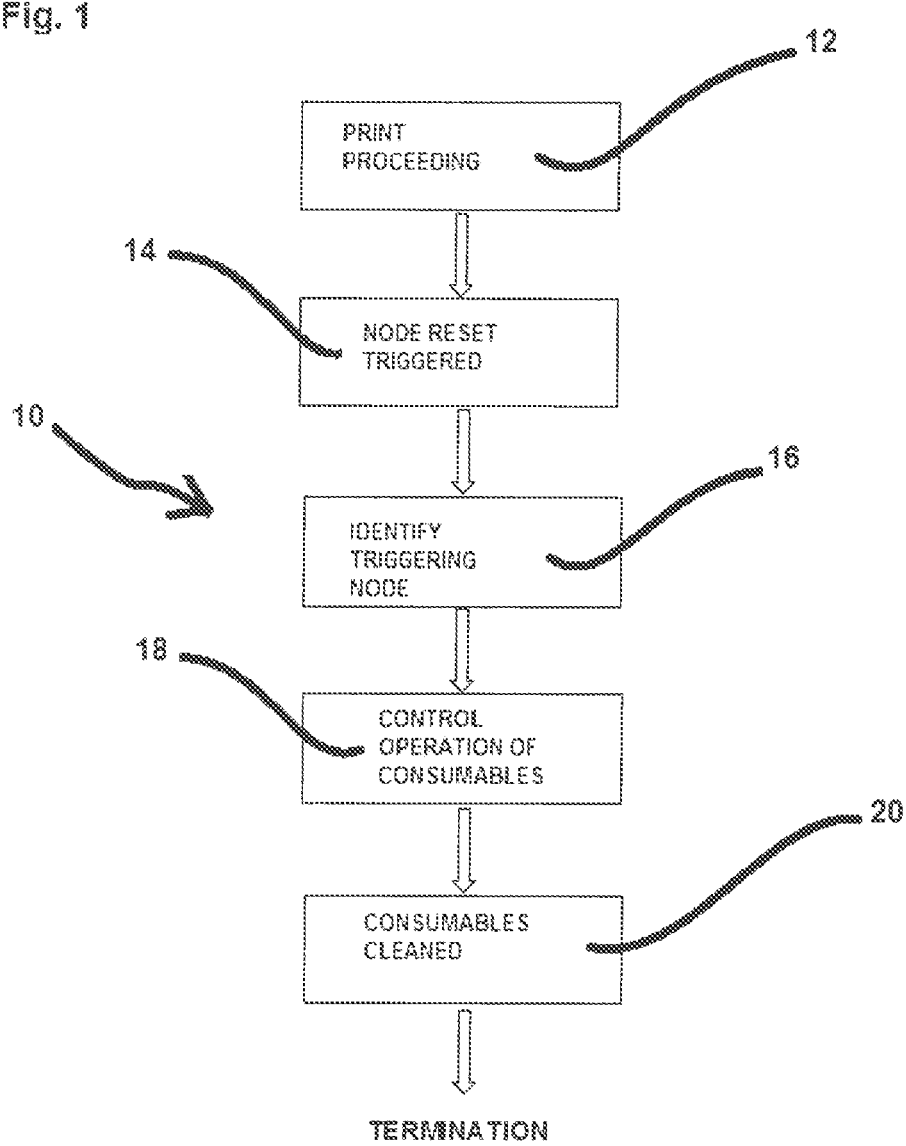
FIG. 1 is a flow diagram that illustrates an example of a print termination method.

Within a printing apparatus of the disclosure, and which can comprise any form of printing apparatus including inkjet printers, dry toner printers and 3D printing apparatus, a printing operation is controlled to produce printed media and this can involve a variety of different subsystems controlled by way of a plurality of nodes, that are to function in a synchronised manner and to satisfy many control conditions.

Components of the printing apparatus of the disclosure, and which can comprise components of any form of printing apparatus including inkjet printers, dry toner printers and 3D printing apparatus, need to be intact to assure proper outputted printed media. When print defects occur on the printed media those components causing the print defects need to be replaced to allow resuming the generation of proper outputted printed media. In most cases the components requiring replacement are consumables/supplies such as printing blanket, photoconductor (PIP), binary ink developer and charge roller. These consumables/supplies are designed to be replaceable by press operators. In certain cases, more complicated failures occur which may require replacing sub-assemblies and even entire subsystems. Examples of sub-assemblies are sensors, belts, bearings, gears, brackets, tubes, fittings. Subsystems refer to a combination of sub-assemblies which perform specific functions within the printing apparatus.

In many instances, print termination can occur in a normal, wholly predictable, manner. Operation of the various subsystems of the apparatus can be modified in a controlled synchronised sequence in response to completion of a print job, for example when it is determined that no further jobs are queued and all print requests have been completed.

The controlled shutdown of the printing apparatus involves specific control actions, some of which can occur in parallel, while others can occur in series. Subsystems can be modified through activation, deactivation and/or by way of a change in operational parameters. Specific control actions can involve many of the components of the printing apparatus. Such control can serve to retain optimal print quality and avoid damage to components of the printing apparatus, such as the subsystems and consumables/supplies, and maintain their readiness for subsequent print sessions.

Sequences of control actions taken as part of print termination are referred to as a post print sequence. A hierarchical series of post-print sequences with various actions being taken in each sequence can be employed. For example, in a first phase, preparation for termination can involve clearing the paper path, interrupting liquid supply, sponge drying, Binary Ink Developer (BID) drying, heating-lamp deactivation and the switching-off of some voltages. During a second phase, the main motor is parking, all remaining voltages are switched-off and most components are switched to a non-printing state. In a third and final phase, all remaining subsystems are switched to a non-printing state and operation of the main motor is stopped.

In addition to such normal predictable print terminations, triggers for print termination can also arise in an unpredictable and thus abnormal manner. These abnormal print terminations can arise for relatively trivial reasons, such as a paper jam within the paper-supply path, or when one of the many parameters that is controlled in the press reaches an invalid value, that is outside a predefined operational window defined by a minimum and a maximum value. The characteristics of abnormal print terminations are the opposite of normal terminations due in particular to the unpredictable nature of abnormal terminations.

Abnormal print termination sequences can vary broadly. In some cases, all three post-print phases are performed; in other cases a transition from the second to the third phase is performed; and in cases such as electronic board resets, or emergency stops, just the third phase is executed to induce an immediate stop. Thus, abnormal terminations are termination sequences in which certain parts of normal termination sequences are not performed with the intent of shortening the duration to completion. Such short-cuts can bypass specific sequences, or parts of sequences, so that the expected procedure is not followed. The characteristics of abnormal termination sequences may depend on the trigger initiating the abnormal termination.

The triggers for abnormal termination include parameters of urgency and severity and each of which is indicated at one of three levels of 'low', 'medium and 'high'. The combinations of urgency and severity associated with the source of an abnormal termination trigger determine the termination sequence to be used to meet the abnormal termination request. As examples, print-media jams inside a feeding/stacking unit are categorized with medium urgency and severity; print-media jams inside a printing engine have medium severity but high urgency. Triggers arising from nodes, that as examples can comprise electronic boards or stored machine readable instructions such as, for example, a software routine, and controlling print apparatus subsystems, have a high severity and high urgency and arise when node resets occur. The print apparatus comprises a wide variety of nodes and resets arising at one node can cause all nodes to reset thereby causing the print apparatus to shut down as quickly as possible and without delay to allow for modification or completion of operation of component parts of the printing apparatus. Such immediate shut down can lead to damage of the component parts of the printing apparatus such as subsystems and consumables/supplies.

Damage to parts of the printing apparatus, such as subsystems and consumables/supplies, can interrupt their use, and shorten their lifespan. These damaged parts of the print apparatus can in turn lead to interruption of use of the apparatus, and increased inconvenience and expense for the user particularly if of the damaged consumable is to be replaced.

As a particular example of the damage that can arise, a common issue with a direct transition to the third post-print phase noted above that can occur during an abnormal termination is that ink remains on the consumables/supplies. Node resets can take in the region of 3-7 minutes to resolve and within that time, the ink can fuse onto the surfaces of the consumables/supplies. The fused ink can permanently damage the consumables/supplies, requiring replacement, or attempted repair, all of which can impact on print quality and increase the likelihood of print defects. In addition, damaged consumables/supplies can require replacement leading to added expense and inefficiencies and reducing productivity. The replacement of consumables/supplies leads to further requirements such as re-calibrations which further increase operational delays.

In an example, the printing engine of a digital print press may include three main transfer components which can comprise drums or belts, such as the photoconductor drum (PIP), the ITM drum with mounted blanket, and the impression drum for engaging with the media to be printed on. A printing sequence can involve writing a latent image on the PIP; engaging the Binary Ink Developer (BID) to transfer charged ink to the latent image on the PIP drum; transferring the ink to the blanket on the ITM drum; heating the ink on the blanket prior to final transfer to the media by interaction with the impression drum. Many supporting subsystems and consumables are employed in the printing press operation. Examples of such subsystems can comprise electromechanical devices include heating lamps, imaging oil system (ink liquid carrier), charging components, fitters, blowers, pumps. These press subsystems are controlled using various nodes such as machine readable instructions and electronic boards. During printing, ink can be transferred to and from consumables under the control of such subsystems, such as transfer between the PIP and the ITM blanket and so a sudden unexpected termination can leave ink on the surfaces of those consumables or part transferred there-between.

Termination instructions of different urgency can be initiated. For example, in some devices "Break Immediately" terminations can halt printing as fast as possible, irrespective of other considerations. "Break on Spread" terminations can allow printing of the current spread pages before termination and "Break on Separation" terminations can allow for completion of printing the current separation for a coloured image before termination.

"Break Immediately" terminations are examples of abnormal terminations that are likely to cause damage to the consumables and can be invoked by a node reset. For example, in some devices, node resets most commonly originate at the Paper Control Node (PCN) and the BID Control Unit (BDU) node. However, node resets can also be initiated by a Main Control Unit (MCU) node, a Power Distribution Board (PDB) node, a Main Ink Control (MIC) node, a Charge Roller Unit (CRU) node, and by a Drum Control Interface (DCI) node, and also within machine readable instructions, although it should of course be appreciated that this list is not complete and many other examples exist.

Once a trigger for a "Break Immediately" abnormal termination sequence has been initiated, an example of the disclosure can include identifying the node at which the reset occurred the reset and controlling operation of a selected component of the print apparatus responsive to the identified node for ongoing operation of the component as part of the termination procedure. Also, once the specific node is identified, some of the other nodes (that did not trigger a termination) can normally, or near-normally, terminate their operational sequences since the nodes are effectively independent. Thus, the non-triggered, independent nodes can continue normal or near-normal termination procedure. That is, in an example of the disclosure, a node reset comprises a local event in the network of nodes, rather than a global event possibly affecting all nodes.

Examples of the disclosure can involve responding to an abnormal termination trigger in a more controlled/organised manner to reduce damage to consumables thereby maintaining print quality and reducing the likelihood of print defects. Reducing damage to the consumables can also increase their lifespan and so reduce inconvenience and expense for the user. The nodes, within the printing apparatus from which abnormal print termination triggers originate can be identified, and a termination sequence invoked allowing continued operation of selected subsystems for removal of ink from an associated consumable to reduce potential for damage prior to termination.

A method of the disclosure can comprise a "break immediately" protocol to respond to abnormal print termination scenarios. Examples of nodes that may trigger a reset are a paper control node, a main control unit, a power distribution board, a BID control unit, main ink control, charge roller unit and a drum control Interface, or machine readable instructions stored in the printing apparatus.

Examples of printing apparatus consumables that can benefit from termination procedure of the disclosure can include a PIP, ITM blanket and ink and oil handling/control elements for example within the cleaning station. Further, a node reset triggered from a control node of a BID unit can allow for ink already passed on by the BID to the PIP to continue to be transferred onto the blanket and media prior to termination. In this example the node reset at the BID may have damaged the BID, but the PIP and blanket can undergo normal termination sequences and the use of consumables can be properly deactivated, for example involving cleaning so as to have ink removed, and thereby be ready for next use. Printing can then efficiently resume without delay once the reset that initiated the abnormal termination has been resolved, since there is no damage to the components that needs to be addressed.

As a further example, and with a reset having been triggered at a Paper Control Node (PCN), ink can be transferred from the BID unit to the PIP, and the unit then initiate a dry BID sequence. The ink can be subsequently transferred from the PIP onto the blanket of the ITM so that use of consumables is properly deactivated, and for example cleaning of the BID unit and the PIP can occur. The reset arising at the PCN, and the inactivity at that node, prevents onward transfer of ink from the blanket of the Intermediate Transfer Member. Ink then remains on the blanket of the ITM prior to termination and so potential damage to the blanket can occur.

Examples of the disclosure can employ the autonomous operation of nodes within the printing apparatus such that a reset triggered at one node, does not affect ongoing operation by way of other 'non-reset' nodes. Examples of the disclosure can also seek to limit the damage that can occur to the components during abnormal termination. For example, this can serve to enhance the degree to which the use of consumables is properly deactivated, for example involving cleaning by removal of ink from consumables, prior to a print operation terminating. The node or nodes that continue to operate as part of a termination procedure subsequent to a node reset occurring at another node can be determined responsive to the identity of the node at which the reset occurred. For every node that can fail, there can be a predetermined selection of nodes that can continue to operate, either wholly or in part, as part of the termination procedure of the disclosure. The relationship between a failed node and those that can continue to operate as part of the termination procedure of the disclosure can be defined by any appropriate mapping technique.

Turning now to FIG. 1, an example of a print termination method 10 of the present disclosure is illustrated by way of a flow diagram in which a desired print procedure 12 is executing. During such operation, and upon a node reset being triggered at block 14 at one of the nodes of the printing apparatus and, the node that initiated the reset is identified at block 16.

The ongoing operation of subsystems affecting consumables/supplies of the printing apparatus is then controlled at block 18 in response to the identification of the node that triggered the reset. The ongoing controlled operation of the subsystems allows for the cleaning at block 20 of consumables of the printing apparatus prior to an example of abnormal termination of the disclosure, and so as to reduce print defects and maintain print quality.

In the illustrated example, the degree to which the use of consumables is properly deactivated, for example involving cleaning, or the consumable and/or subsystem brought to a non-printing state that is not damaging for future use is improved. As an example of the disclosure, the proper deactivation can prevent fusing of ink on the consumables and the related reduction in print quality, but also enhance efficiency in operation by rendering the consumables ready to use once the reset has been resolved. Of course, damage to consumables/supplies can arise otherwise than from ink remaining on consumables. Damage can also arise for other reasons such as from prolonged engagement and/or voltages while the consumables are not wet by imaging oil.

Figure 2:
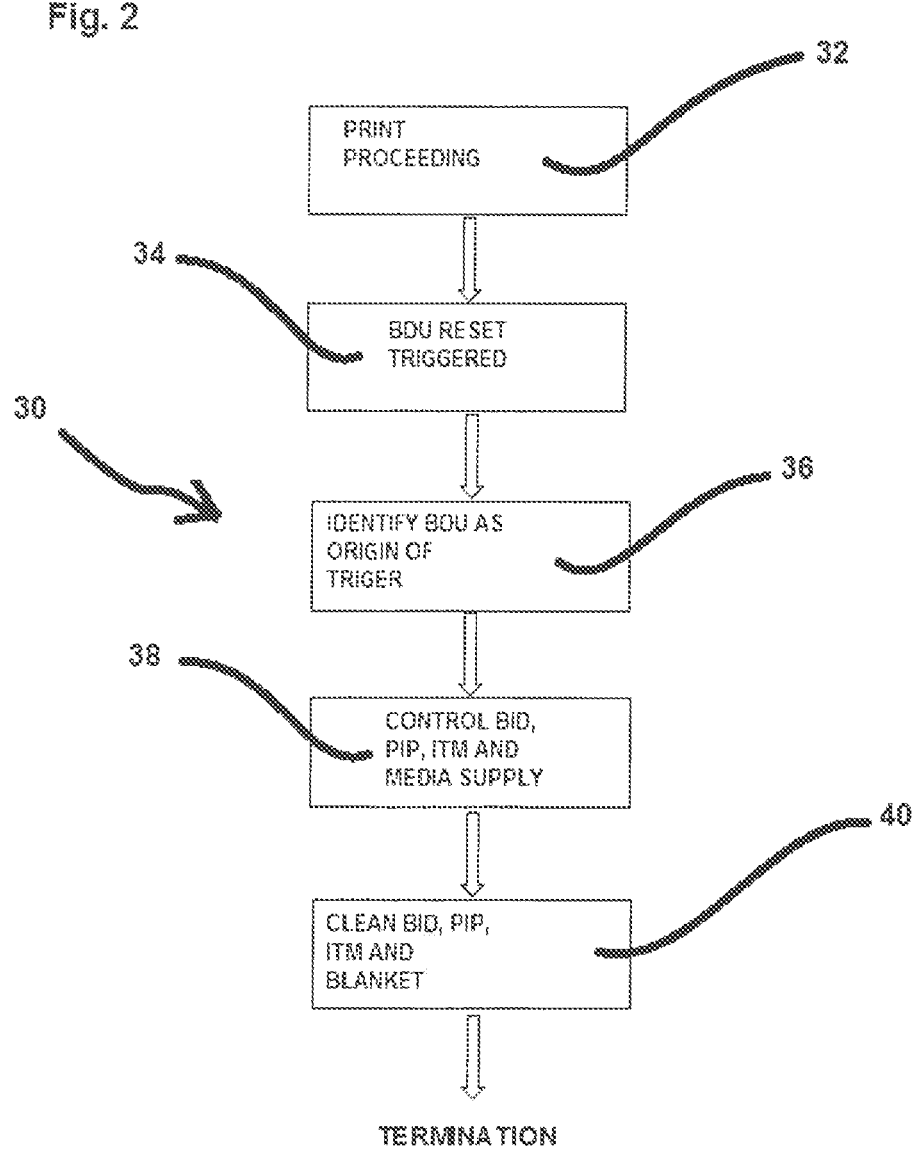
FIG. 2 is a flow diagram of further detail of an example of a print termination method.

A further particular example of a print termination method 30 is illustrated by way of the flow diagram of FIG. 2 in which, during a print procedure at block 32 a BDU reset is triggered at block 34 at a BID control node. At block 36, it is determined that a BDU node is responsible for triggering the reset and, on the basis of that determination, subsystems and consumables/supplies downstream from the BID, can continue their normal operation. For example controlled use of the PIP, blanket and media supply continues by way of the selected related subsystems at block 38 so as to effect cleaning of the PIP, ITM and its blanket at block 40. Prior to abnormal termination, the PIP and blanket are cleaned through ink removal.

A yet further example of a print termination method 50 is illustrated with reference to the flow diagram of FIG. 3 in which ongoing printing process at block 52 experiences a node reset triggered from a PCN at block 54. At block 56, the source of the triggered node reset is Identified as the PCN and the ongoing operation of the selected subsystems associated with the BID, PIP and ITM is controlled at block 58 so as to permit transfer of ink from the BID unit to the PIP and onto the blanket of the ITM at block 60.

Figure 3:
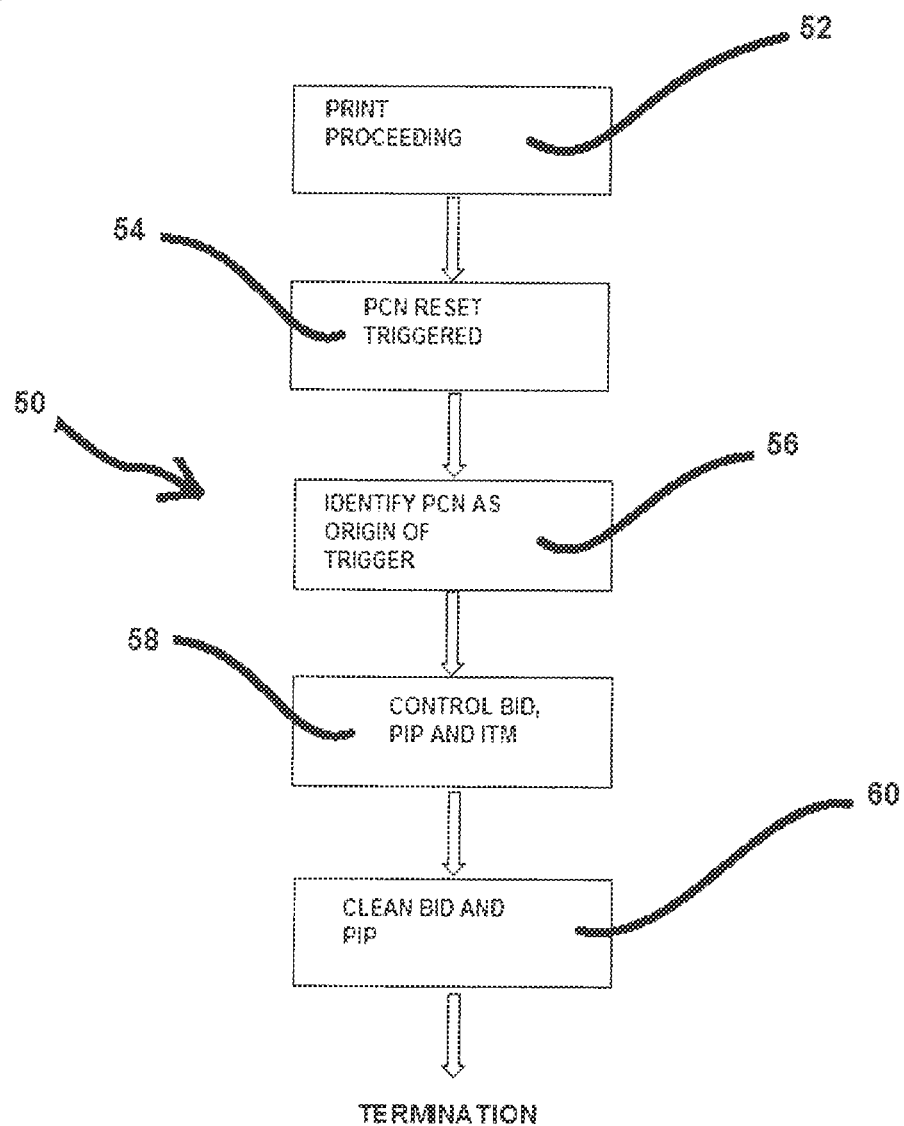
FIG. 3 is a flow diagram of further detail of another example of a print termination method.

However, in the example illustrated in FIG. 3, no further transfer from the blanket is possible due to the nature of the node reset arising from the PCN. The BID unit and PIP can then have ink removed, so as to prevent damage thereto and assist with preparation for the subsequent operation. In this particular example, ink is not removed from the blanket of the ITM.

Figure 4:
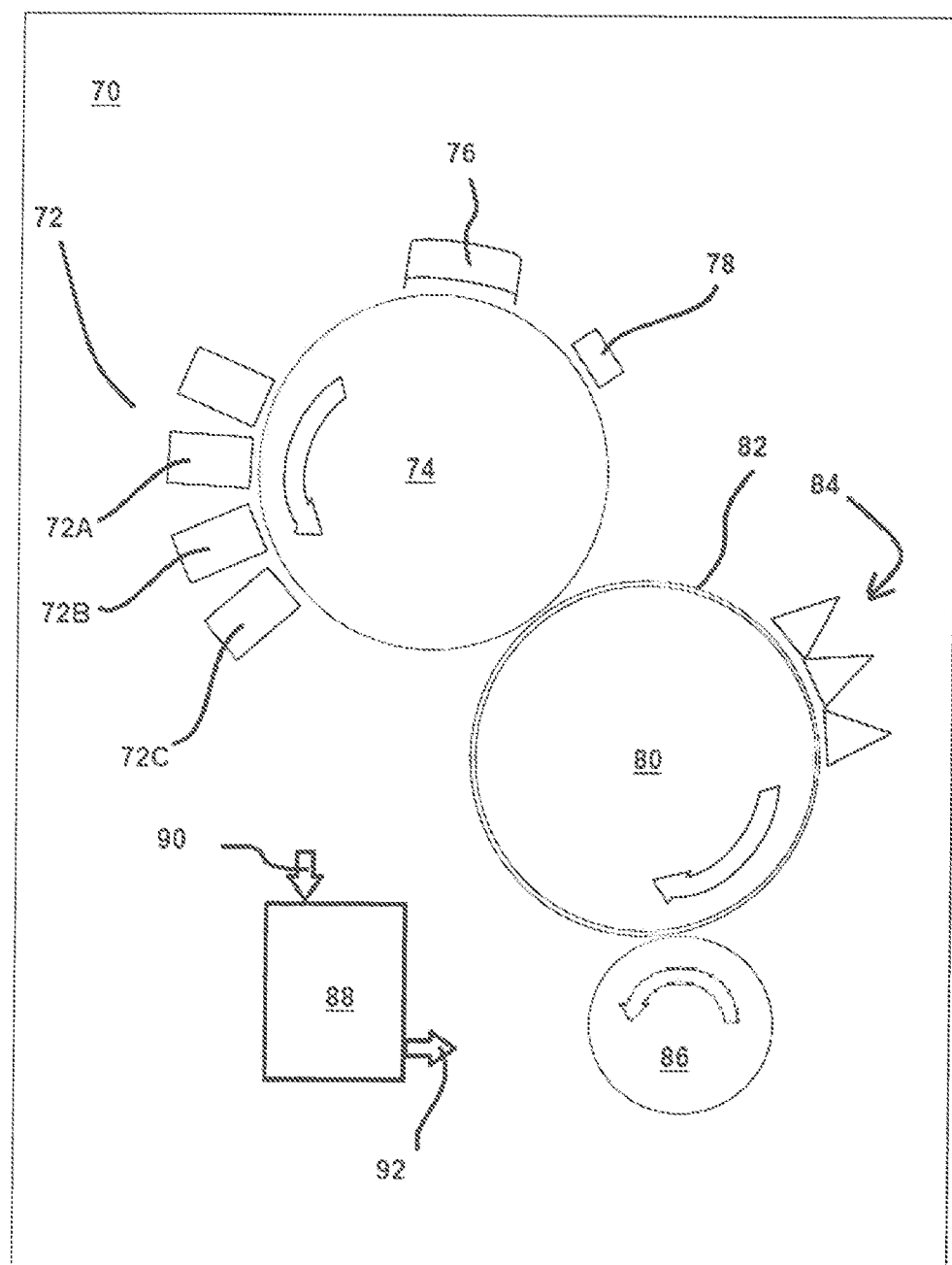
FIG. 4 is a schematic side view of a printing engine of a printing apparatus that can terminate operation according to an example of the present disclosure termination method.

Turning now to FIG. 4, there is a schematic side view of a printing engine 70 of a digital printing press of the present disclosure and to operate according to an example of a print termination method of the present disclosure. The printing engine 70 comprises an array of BID units 72 which can include a yellow ink unit 72A, a magenta ink unit 72B, and a cyan unit 72C. Within the press there is a variety of subsystems and consumables/supplies that are involved in the supply, application, metering and removal of ink by the printing process. Subsystems and consumables/supplies are controlled and activated so that the consumables can perform their ink handling operations.

The engine further includes a photoconductor drum PIP 74, and a charging unit 76 and a cleaning unit 78 that are associated with the PIP 74. Also provided is an ITM drum 80 and outer blanket 82 for receipt of an ink image from the PIP drum 74. Associated with the ITM drum 80 is a heating unit 84 that assists with transfer of the image onto print media passing between the blanket 82 of the ITM drum 80 and an impression drum 86. In operation, the PIP 74, ITM drum 80 and the impression drum are to rotate in the direction of the arrows shown. As an example of the present disclosure, the printing engine 70 can also include a print termination controller 88 to receive a print termination signal at an input 90, and deliver a control signal at an output 92 for controlled ongoing operation of subsystems and their associated print engine consumables prior to termination.

The state of operation of the printing engine 70 in FIG. 4 is such that yellow ink has already been transferred from BID unit 72A to the blanket 82 of the ITM drum 80, magenta ink is in the process of being transferred from the BID unit 72B to the PIP drum 74 and onward onto the blanket 82 of the ITM drum 80, while cyan ink remains wholly within the BID unit 72C without any transfer to the PIP drum 74 having yet occurred.

During normal operation, and in particular with reference to BID unit 72B, magenta ink is transferred to the PIP drum 74 through the application of BID control voltages, a BID engagement mechanism and the charging of the printing imaging plate drum 74. Transfer of the magenta ink from the surface of the PIP drum 74 to the blanket 82 of the ITM drum 80 occurs under the control of a blanket voltage and mechanical engagement, whereas transfer of the yellow ink from the blanket 82 of the ITM drum 80 to the print media (not shown) occurs under the control of the heating unit 84 and the application of pressure by way of the impression drum 86.

A node reset leading to a "break immediately" termination procedure without any ongoing control of subsystems would lead to termination of the printing process with the ink in situ as noted above and so with yellow and magenta ink remaining on the blanket 82 of the ITM drum 80, and magenta ink remaining on the PIP drum 74. Cyan would remain on the Developer Roller of the BID unit 72C. During the reset procedure, which can take between 3-7 minutes, the ink remaining on the PIP drum 74 and the blanket 82 of the ITM drum 80 fuses which can permanently damage both the PIP and the blanket, leading to print defects a decrease in print quality and also the need for replacement of the consumables and re-calibration of the printing process.

Examples of the present disclosure allow for the ongoing control and use of unaffected nodes so as to provide for an abnormal termination sequence that results in less damage to components of the print apparatus such as subsystems and consumables/supplies. Non-affected nodes are thereby permitted to continue to participate in the termination sequence, so as to avoid sudden deactivation and resultant damage. As examples, the ongoing operation at the non-effected nodes can be to allow for activation/deactivation of subsystems to allow for the transfer ink, to clean consumables/supplies of residual ink such as background ink, and to render the print apparatus and consumables ready to enable rapid restarting of subsequent print sessions. With reference to the example illustrated by the flow diagram of FIG. 2, a reset that is identified to have been initiated by the BID Control Unit could allow operation of the PIP drum 74, ITM drum 80 and impression drum 84 to continue and to thereby allow ongoing transfer of ink from the PIP drum 74 to the blanket 82 of the ITM drum 80, and onward from the blanket 82 to the media. This allows for removal of ink from the PIP drum 74 and the blanket 82 of the ITM drum 80, there is then no ink left on those consumables to fuse and cause damage. The blanket 82 can require handling after the abnormal termination sequence has ended, and in some cases, actions can successfully recover blanket functionality. In other scenarios this cannot be achieved successfully and this can determine whether the blanket is to be replaced or not. There is therefore less impact on print quality and the consumables are then ready for use once the reset has been resolved allowing for less frequent replacement. The BID may however then be due for replacement.

With reference to the example of the disclosure illustrated by FIG. 3, the identification of a PCN reset could initiate a control sequence allowing for drying of the BID unit 72C for the cleaning of cyan ink therefrom, and the ongoing transfer of magenta ink from the PIP drum 74 to the blanket 82 of the ITM 80, to thereby effectively allow for cleaning of the PIP drum 74. While, in this example, ink remains on the blanket 82 of the ITM drum 80, resulting in damage during the reset procedure and possible replacement of the blanket 82, controlled cleaning of the BID unit 72C, and the PIP drum 74 can be achieved prior to termination thereby preventing damage to those consumables. The blanket 82 can require handling after the abnormal termination sequence has ended, and in some cases, actions can successfully recover blanket functionality. In other scenarios this cannot be achieved successfully and this can determine whether the blanket is to be replaced or not.

Figure 5:
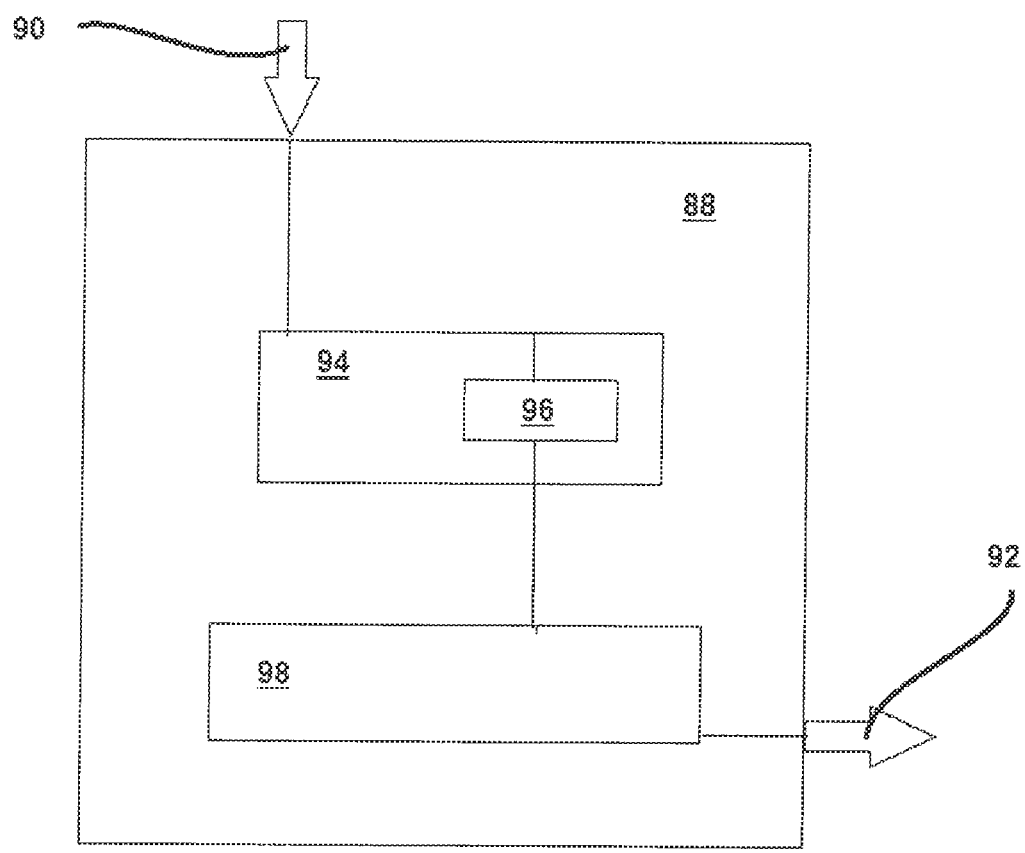
FIG. 5 is a schematic illustration of an example of a print termination controller of the disclosure.

FIG. 5 is a schematic illustration of an example of the print termination controller 88 of FIG. 4. The print termination controller 88 can achieve the controlled operation of print apparatus, through identification of the node from which a node reset originates, for ongoing operation of non-affected nodes so as to prevent damage during termination to component parts controlled by way of such nodes. The print controller 88 can have an input 90 for receiving a termination signal indicating that a printing operation has to terminate. A processor 94 receives and processes the termination signal to identify the nature of the termination instruction received at 90, and can include a node identifier 96 to identify a node from which the termination signal may have originated. A termination control module 98 is connected to the node identifier and produces a print termination control signal at the output 92 to control a selected subsystem responsive to the identified node to prevent damage such as, for example allowing for removal of ink from a consumable.

The print termination controller 88 can control a selected plurality of subsystems, with the selection determined by reference to the node identified as the source of the node reset.

In addition to the potential for damage to components of the printing apparatus, the reduction in print quality with greater likelihood of print defects, and reduced productivity and increased inconvenience and cost for the user, abnormal print terminations can also result in an unreliable count of completed sheets within a print job.

Terminations, and in particular abnormal terminations, can also have an effect of the manner and accuracy in which the passage of print media through the printing apparatus is monitored.

The sheet counting that occurs during a print job relies on a signal handshake between a sheet supply such as a sheet feeding unit, and an end collection point for the printed sheets, such as a stacking unit. When a sheet exits the feeder unit, a 'sent' signal is triggered and when the sheet is delivered to the stacking unit a 'receive' signal is created. The receive message is paired with the sent message so as to determine delivery of the sheet. This in turn allows for a sheet counter to be incremented, and a display in the user interface changes to reflect this. This signal-pairing and sheet counting is under the control of a sheet manager function which is part of the PCN of the print apparatus.

Sheets are considered printed once the 'receive' signal indicates delivery to the stacking unit and the counter incremented. During normal print termination, there will be no mismatch between the sheet counter and the number of sheets delivered to the stacking unit. However, during an abnormal stopping sequence, the PCN can function to clear the paper path before termination is complete. In some scenarios, although a printed sheet is safely delivered by inertia, such a sheet will not be counted if the PCN is either in an erroneous or transient state.

In an example of the disclosure, sheet counting is performed with reference to signals from sheet handling sensors monitoring the passage of a sheet through the apparatus. Examples of such sensors are employed to trigger jam events through the non-arrival of a sheet at the sensor within an expected timing window. The sheet handling sensors can each function independently of the PCN and its sheet manager and serve directly to trigger the Main Control Node.

An example of the disclosure can therefore include monitoring the progress of sheets through the printing apparatus so as to count the sheets passing through monitoring points within the apparatus prior to print termination. The progress can be monitored at the sheet path sensors within the apparatus to confirm, and count, when each sheet has passed each sensor point. In particular, if the PCN is in an erroneous or transient state with its sheet manager inactive, the number of sheets within a particular point of the apparatus, or having passed a particular point, can be assessed by reference to the sheet handling sensors which are independent of the PCN.

Examples of the disclosure can allow for reliable counting of printed and delivered sheets even in situations of abnormal termination. The asynchronous monitoring of sheet-path sensors provides an accurate count of the sheets of a print job actually printed, even during abnormal termination scenarios. Examples of the disclosure can allow for the accurate monitoring of the number of successfully printed sheets and finds particular use in applications such as Variable Data Printing (VDP), and security applications where printer continuity, and avoidance of duplication, is a particular feature.

The disclosure can also provide for a computer-implemented method of print termination in print apparatus including a plurality of nodes and as initiated by a node reset, the method including identifying the node at which the reset occurred, and controlling operation within the print apparatus by way of a selected node, the selected node being different from the identified node and selected responsive to the identification of the identified node, for operation of a component of the print apparatus as part of a termination procedure.

The disclosure can further provide for a non-transitory machine-readable storage medium encoded with instructions executable by a processor, the machine-readable storage medium comprising instructions to identify a node within print apparatus that has triggered a print termination, instructions to control operation within the print apparatus by way of a selected node, the selection being responsive to the identification of the identified node, for operation of a component of the print apparatus as part of a termination procedure.

Although implementations of print termination methods and apparatus have been described in language specific to structural features, components, computer related media and/or methods, it should be understood that the disclosure is not limited to the specific features or methods described. Rather, specific features and methods are disclosed as examples of implementations of the printing methods and apparatus of the disclosure. The computer usable program code may be provided to a processor of a general purpose computer, special purpose computer, or other programmable data processing apparatus or device to produce a machine, such that the computer usable program code, when executed via, for example, such data processing apparatus, can implement the functions or acts as specified in the present disclosure. The storage medium of the disclosure can comprise any appropriate medium for temporary, permanent storage, whether removable or non-and including, but not limited to, Read Only Memory (ROM), Random Access Memory (RAM), Compact Discs (CDs), Digital Versatile Discs (DVDs), etc.

While various examples have been illustrated in the accompanying drawings and description, it should be understood that the disclosure is not limited to the examples disclosed, but is capable of numerous modifications without departing from the scope of the disclosure as set out in the following claims.

The invention claimed is:

1. A print termination method comprising:
   detecting, by a processor, a reset within a print apparatus during a printing process, wherein the reset is an abnormal termination of the print apparatus, wherein the print apparatus includes a plurality of nodes that control operations of components in the print apparatus,
   identifying, by the processor, among the plurality of nodes, a reset node that initiated the reset,
   in response to identifying the reset node, identifying, by the processor, among the components in the print apparatus, a component whose ongoing operation was terminated by the reset of the reset node, and
   in response to identifying the component whose ongoing operation was terminated b the reset of the reset node, controlling, by the processor, the component to allow the component to complete the ongoing operation, including completing a transfer of ink from the component onto a next component in the print apparatus, to remove any left-over ink from the component as part of a termination procedure.

2. The print termination method of claim 1, wherein the reset occurred at an electronic board within the print apparatus.

3. The print termination method of claim 1, further comprising:
   causing other components in the print apparatus that were not controlled by the reset node to continue their ongoing operations to completion.

4. The print termination method of claim 1, wherein the component whose ongoing operation was terminated by the reset of the reset node comprises a subsystem of the print apparatus.

5. The print termination method of claim 1, wherein the component whose ongoing operation was terminated by the reset of the reset node comprises a consumable of the print apparatus.

6. The print termination method of claim 1, further comprising:
   controlling, by the processor, an ink-removal operation at another component downstream from the component whose ongoing operation was terminated by the reset of the reset node.

7. The print termination method of claim 1, further comprising:
   monitoring sheets moving through the print apparatus to identify a delay in arrival of the sheets at a monitoring location, and
   counting the sheets monitored at the monitoring location.

8. The print termination method of claim 7, wherein the sheets are monitored at a sheet path sensor within the print apparatus.

9. The print termination method of claim 1, wherein the reset node is a Paper Control Node in the print apparatus.

10. The print termination method of claim 1, wherein the reset node is a Binary-Ink-Developer (BID) Control Unit Node in the print apparatus.

11. A print termination controller of a print apparatus comprising:
    a processor to, responsive to a reset in the print apparatus during a printing process, identify a reset node that initiated the reset, wherein the reset is an abnormal termination of the print apparatus, and
    a control element to:
    responsive to the identification of the reset node, identify a component in the print apparatus whose ongoing operation was terminated by the reset of the reset node, and
    responsive to the identification of the component whose ongoing operation was terminated by the reset of the reset node, control the component to allow the component to complete the ongoing operation, including completing a transfer of ink from the component onto a next component in the print apparatus, to remove any left-over ink from the component as part of a termination procedure.

12. The print termination controller of claim 11, wherein the reset occurred at an electronic board within the print apparatus.

13. The print termination controller of claim 11, wherein the control element is to control an ink-removal operation at another component downstream from the component whose ongoing operation was terminated by the reset of the reset node.

14. A non-transitory machine-readable storage medium storing instructions that are executable by a processor to cause the processor to:
    detect a reset within a print apparatus during a printing process, wherein the reset is an abnormal termination of the print apparatus, and wherein the print apparatus includes a plurality of nodes that control operations of components in the print apparatus;

identify, among the plurality of nodes, a reset node that initiated the reset;

in response to the identification of the reset node, identify a component whose ongoing operation was terminated by the reset of the reset node; and in response to the identification of the component whose ongoing operation was terminated by the reset of the reset node, control the component to allow the component to complete the ongoing operation, including completing a transfer of ink from the component onto a next component in the print apparatus, to remove any left-over ink from the component as part of a termination procedure.

15. The non-transitory machine-readable storage medium of claim 14, Wherein the instructions are executable to cause the processor to:

control an ink-removal operation of another component downstream from the component those ongoing operation was terminated by the reset of the reset node.

* * * * *